United States Patent [19]

Malof

[11] Patent Number: 4,494,428
[45] Date of Patent: Jan. 22, 1985

[54] CUTTING TOOL INSERT ASSEMBLY FOR SHEARS

[76] Inventor: A. Paul Malof, 35 Burgundy Ter., North Amherst, N.Y. 14120

[21] Appl. No.: 352,641

[22] Filed: Feb. 26, 1982

[51] Int. Cl.$^3$ .......................... B26D 3/16; B26D 7/02
[52] U.S. Cl. ........................................ 83/389; 83/465; 83/641; 83/693; 83/700
[58] Field of Search ................. 83/389, 465, 460, 694, 83/700, 647, 640, 641

[56] References Cited

U.S. PATENT DOCUMENTS

| | | | |
|---|---|---|---|
| 741,181 | 10/1903 | Stevenson | 83/700 |
| 1,476,246 | 12/1923 | Gray | 83/640 |
| 1,866,855 | 7/1932 | Kirsten | 83/700 |
| 2,132,136 | 10/1938 | Tucker | 83/380 |
| 2,742,087 | 4/1956 | Smith et al. | 83/389 |
| 3,134,286 | 5/1964 | Judd | 83/700 |
| 3,590,677 | 7/1971 | Smith | 83/694 |
| 3,593,610 | 7/1971 | Valente | 83/698 |
| 4,011,781 | 3/1977 | Whistler, Jr. | 83/641 |
| 4,130,040 | 12/1978 | Donnelly, Sr. et al. | 83/694 |

FOREIGN PATENT DOCUMENTS 115435 of 1941 Australia .................. 83/389

Primary Examiner—Frank T. Yost
Assistant Examiner—Hien H. Phan
Attorney, Agent, or Firm—Robert C. Weber

[57] ABSTRACT

A removable cutting tool insert assembly for shears fed with stock, such as bar stock, and including a ram actuatable upper housing closeable downwardly toward and biased upwardly away from a bolster supportable lower housing in a direction transverse to the stock feed direction, with an upper elongated shearing knife mounted on the upper housing and movable for centering adjustment longitudinally of a lower elongated shearing knife mounted on the lower housing upstream of and movable for clearance adjustment laterally of the upper knife, with a hold down movably mounted on the upper housing adjacent the upper knife and biased downwardly toward the opposite lower knife to a location below the recessed top initial stock engaging cutting edge surface portion of the upper knife, but above the lower edge surface of the upper knife, and with a work support movably mounted on the lower housing adjacent the lower knife and biased upwardly toward the opposite upper knife to a location substantially flush with the recessed bottom initial stock engaging cutting edge surface portion of the lower knife, to facilitate stock feed. Thus, during closing movement, the hold down resiliently clamps the upstream stock portion against the lower knife prior to and during shearing, in order to prevent the upstream stock portion from kicking, while the work support resiliently clamps the downstream stock portion against the upper knife during shearing, in order to prevent the downstream stock portion from bending.

2 Claims, 9 Drawing Figures

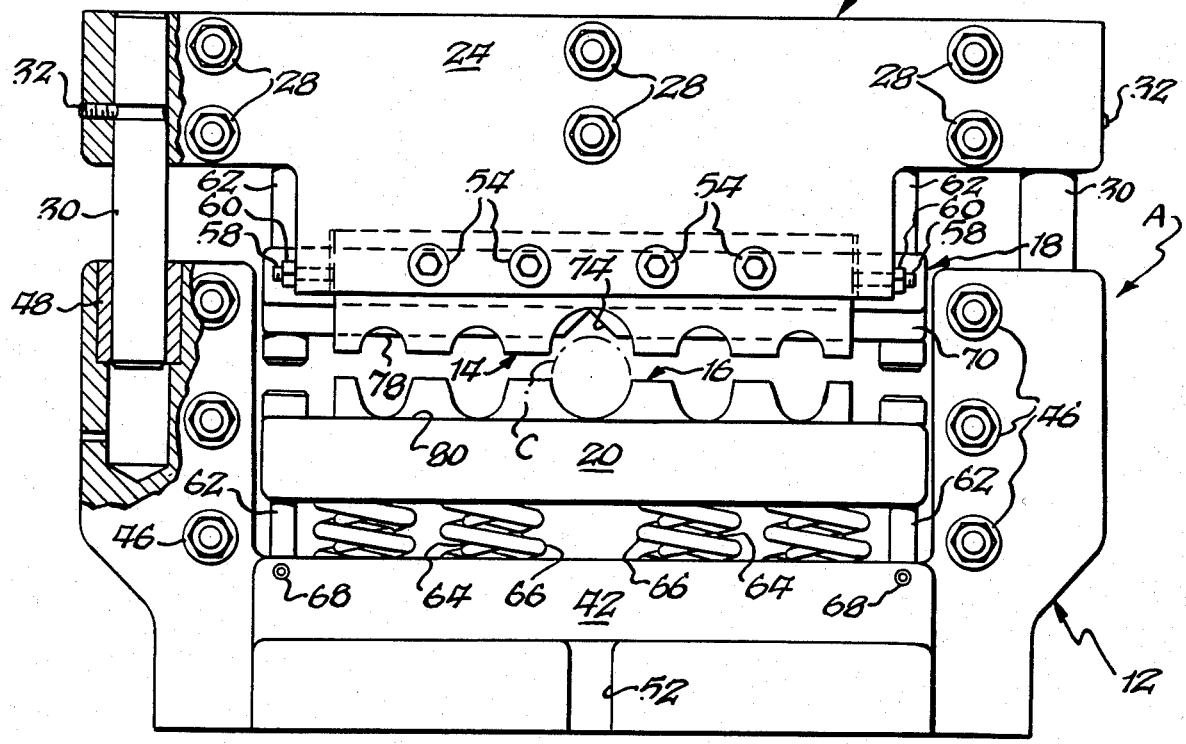
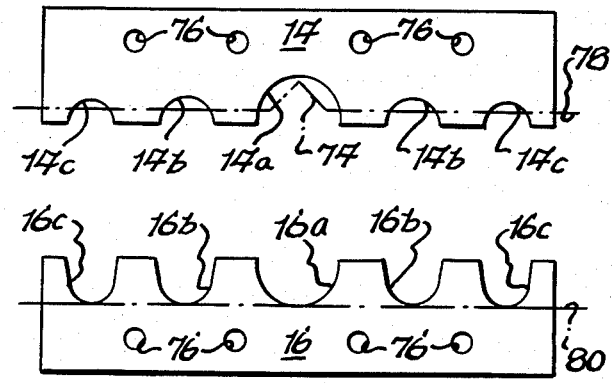
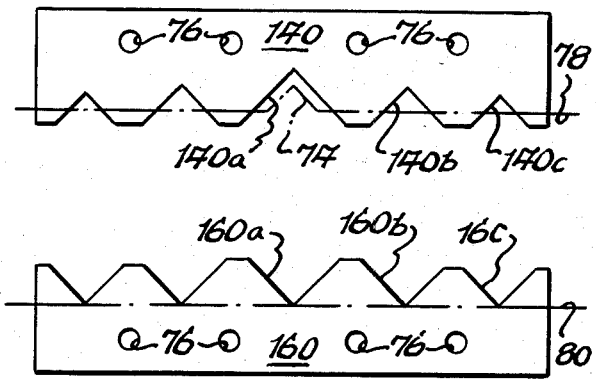
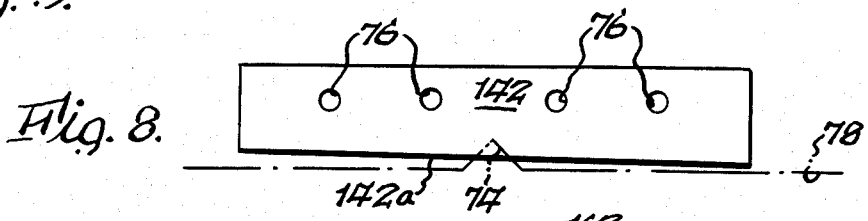
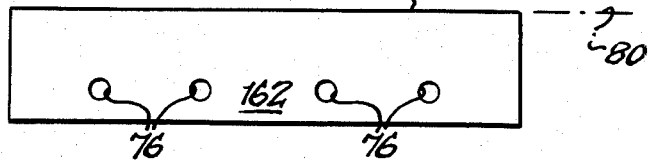

CUTTING TOOL INSERT ASSEMBLY FOR SHEARS

BACKGROUND OF THE INVENTION

1. Field of the Invention

This invention relates to shears, and more particularly to a new and improved removable cutting tool insert assembly for shears fed with stock, such as bar stock.

2. Prior Art

Shears are heavy duty machines designed for continuous production of metal blanks such as flats, bars and billets used for such operations as forging and extruding. Automotive valves, nuts and bolts, wrenches, piston pins, gears etc. are just a few of the high volume parts formed from sheared blanks. Of the many types of cutoff machines available to volume users of billets and bars (round, square or other), flats, angles, channels and other standard mill shapes, few can match the speed and efficiency of the shear.

Two types of cutting tools used in shears are die and knife respectively, and the shear normally is equipped with top and bottom cutting tool housings, which usually are part of the main frame of the shear, with the bottom cutting tool housing being stationary and the top cutting tool housing being movable in a vertical direction and driven either mechanically as by a crankshaft and flywheel type drive, or fluidly, as by a hydraulic motor. In addition, one of the most important considerations in precision shearing is that the workpiece or stock be held as rigidly as possible. The main or parent part of the stock being fed in must be rigidly held as close to the shear area as practically possible to prevent any upward movement (i.e. ("kicking")). Similarly, the length or blank being sheared must be securely supported to prevent downward movement (i.e. "bending"), during the shearing stroke. These hold down and work-support units also generally are part of the main frame of the shear, and usually each works independently.

Considering shears employing knife type cutting tools or the like, U.S. Pat. No. 2,148,248 is pertinent in that it discloses a spring biased hold down on each side of the cutting knives or punches, as well as a resilient work support for one of two strips. However, this cutting tool is not an insert assembly and rather than a single shear, the cutting action is like a punch press operation wherein two parts are cut off, with one receding with the punch and die and the other remaining stationary. Likewise, U.S. Pat. No. 3,451,298 is pertinent because it discloses a positive hold down and a movable work support, both in a tool insert assembly for a shear. However, this is a rather complicated device, the hold-down is not resiliently biased, and the work-support is only partial and moves laterally instead of being biased for vertical movement.

The following U.S. patents are of interest, but less pertinent. U.S. Pat. No. 377,780 discloses an eccentric shear which is provided with a resiliently biased hold down, but does not disclose a work support beyond the shearing zone. U.S. Pat. No. 1,712,723 merely discloses a pitman shear with a hold down, but no work support. U.S. Pat. No. 1,854,516 discloses a combined angle bar shearing and hole punching mechanism but lacks a spring biased hold down and work support. An arm-like member only holds down the bottom flange of an already severed angle bar prior to punching.

As for shears employing die type cutting tools or the like, each of the following six U.S. patents is pertinent from the standpoint of a positive grip cut off feature, most disclosing a fixed die which acts as a hold down, and a movable cut off die. However, usually neither one is resiliently mounted, and these patented mechanisms are quite complex in comparison to the invention. The only patent which clearly discloses a tooling insert assembly is U.S. Pat. No. 3,972,257. The movable die is resiliently mounted, and therefore provides a resilient work support; however, the fixed die is not so resiliently mounted.

The remaining patents in this group are of less pertinence. U.S. Pat. No. 3,204,504 discloses a rather complicated device actuated by a punch, and neither the fixed die nor movable cut off die halves are resiliently mounted. While the latter are resiliently biased apart, this bias is overcome upon actuation of the device. U.S. Pat. No. 3,621,745 merely discloses a clamping or hold down fixed die and a work support or movable die. U.S. Pat. No. 3,735,656 differs in that it is directred to a complex impact die shear with rigid hold down and resilient cut off dies, stock bending being prevented by reverse axial pressure applying members. U.S. Pat. No. 4,086,832 discloses a holding die for necking down a bar and a cut off blade for shearing the necked down part. However, there appears to be neither a work support beneath the cut off blade nor a resilient mounting of the holding die. Finally, U.S. Pat. No. 4,152,959 discloses hydraulic die shearing of hot billets employing a fixed ring die and a movable ring die, neither one of which appears to be resiliently mounted.

In any event, none of the aforesaid patents, in either group, discloses, in a cutting tool insert assmbly for stock fed shears, the combination of movably mounted hold down and work support means for effectively preventing upward movement (i.e. "kicking") of the parent stock and downward movement (i.e. "bending") of the blank respectively, during shearing, resulting in close cut to length blanks and square cuts without distortion or burred edges, as perhaps found in other types of cut off operations.

SUMMARY OF THE INVENTION

Accordingly, a general primary objective of the present invention is to provide a new and improved removable cutting tool insert assembly for fed with stock, such as bar stock shears, which insert assembly is so constructed and designed as to overcome the various deficiences in the aforesaid prior art. To this end, the inventive cutting tool insert assembly includes upper and lower housings, and means mounting the housings on each other for relative closing movement toward and opening movement away from each other in a direction transverse to the stock feed direction the mounting means including resilient means normally biasing the housings into spaced apart relationship; wherein the improvement comprises: upper and lower shear knives; means removably mounting the upper and lower knives on the upper and lower housing means respectively, with one of the knives being offset downstream from the other of the knives in the stock feed direction; the upper and lower knives being elongated in another direction transverse to both the one direction and the stock feed direction and having lower and upper edge surfaces respectively opposing and proximately spaced from each other in the one direction, with the lower and upper edge surfaces being cut away to provide recessed cutting edge surfaces forming respectively top and bottom initial stock engaging positions opposing and remotely spaced from each other in the one direction; a hold down and a work support elongated in the other direction and having lower and upper clamping surfaces respectively; and means movably mounting the hold down and work support on the upper and lower housings respectively adjacent the upper and lower knives respectively, with the lower and upper clamping surfaces facing the bottom and top initial stock engaging portions respectively; the hold down and work support mounting means including resilient means, normally biasing the hold down and work support toward the lower and upper knives respectively, one positioning means locating one of the clamping surfaces closer to the opposite one of the initial stock engaging portions than is the other of the initial stock engaging portions, but not as close to the one initial stock engaging portion as is the edge surface of the knife adjacent the one clamping surface; and another positioning means locating the other of the clamping surface no further from the opposite initial stock engaging other of the portions than is the one initial stock engaging portion but not as close to the other initial stock engaging portion as is the edge surface of the knife adjacent the other clamping surface; whereby upon the closing movement the one clamping surface resiliently clamps one of the upstream and downstream stock portions against the opposite one of the knives both prior to and during shearing, in order to prevent the one stock portion from kicking, while the other surface resiliently clamps the other of the upstream and downstream stock portions against the opposite other of the knives during shearing, in order to prevent the other stock portion from bending.

A specific primary objective of the present invention is to provide such new and improved cutting tool insert assembly wherein: the other positioning means locates th other clamping surface substantially flush with the one initial stock engaging portion, to facilitate stock feed; and the means mounting the knives include adjustable means providing for relative movement of the knives not only toward and away from each other in the stock feed direction for adjusting the clearance between the knives, but also along each other in the other direction for centering knives.

A more specific primary objective of the present invention is to provide such new and improved cutting tool insert assenbly wherein: the upper knife is offset downstream of the lower knife; the one positioning means locates the lower clamping surface closer to the bottom initial stock engaging portion than is the top initial stock engaging portion, but not as close to the bottom intial stock engaging portion as is the lower edge surface of the upper knife; and the other positioning means locates the upper clamping surface no further from top the initial stock engaging portion than is the bottom initial stock engaging portion, but not as close to the top initial stock engaging portion as is the upper edge surface of the lower knife; whereby upon the closing movement, the lower clamping surface resiliently clamps the upstream stock portion against the lower knife prior to and during shearing, in order to prevent the upstream stock portion from kicking, while the upper clamping surface resiliently clamps the downstream stock portion against the upper knife means during shearing, in order to prevent the downstream stock portion from bending.

Another more specific primary objective of the present invention is to provide such new and improved, removable cutting tool insert assembly wherein: the other poritioning means locates the upper clamping surface substantially flush with the bottom initial stock engaging portion, to facilitate stock feed; and the means mounting the knives include adjustable means engageable with one of the inives for moving the same toward and away from the other of the knives in the stock feed direction, for adjusting the clearance between the knives, and adjustable means engagable with the other knife for moving the same along the one knife in the other direction, for centering the knives.

Additional objectives and advantages of the invention will become evident upon consideration of the following detailed description and the accompanying drawings wherein:

BRIEF DESCRIPTION OF THE DRAWINGS

FIG. 3 is a rear or exit side elevation taken on line 3—3 of FIG. 2;

FIGS. 4 and 5 are elevations of upper and lower knives respectively for shearing round bar stock of varying sizes;

FIGS. 6 and 7 are elevations of upper and lower knives respectively for shearing square bar stock of varying sizes, and FIGS. 8 and 9 are elevations of upper and lower knives respectively for shearing flat stock.

DESCRIPTION OF THE PREFERRED EMBODIMENTS

Figure 1:
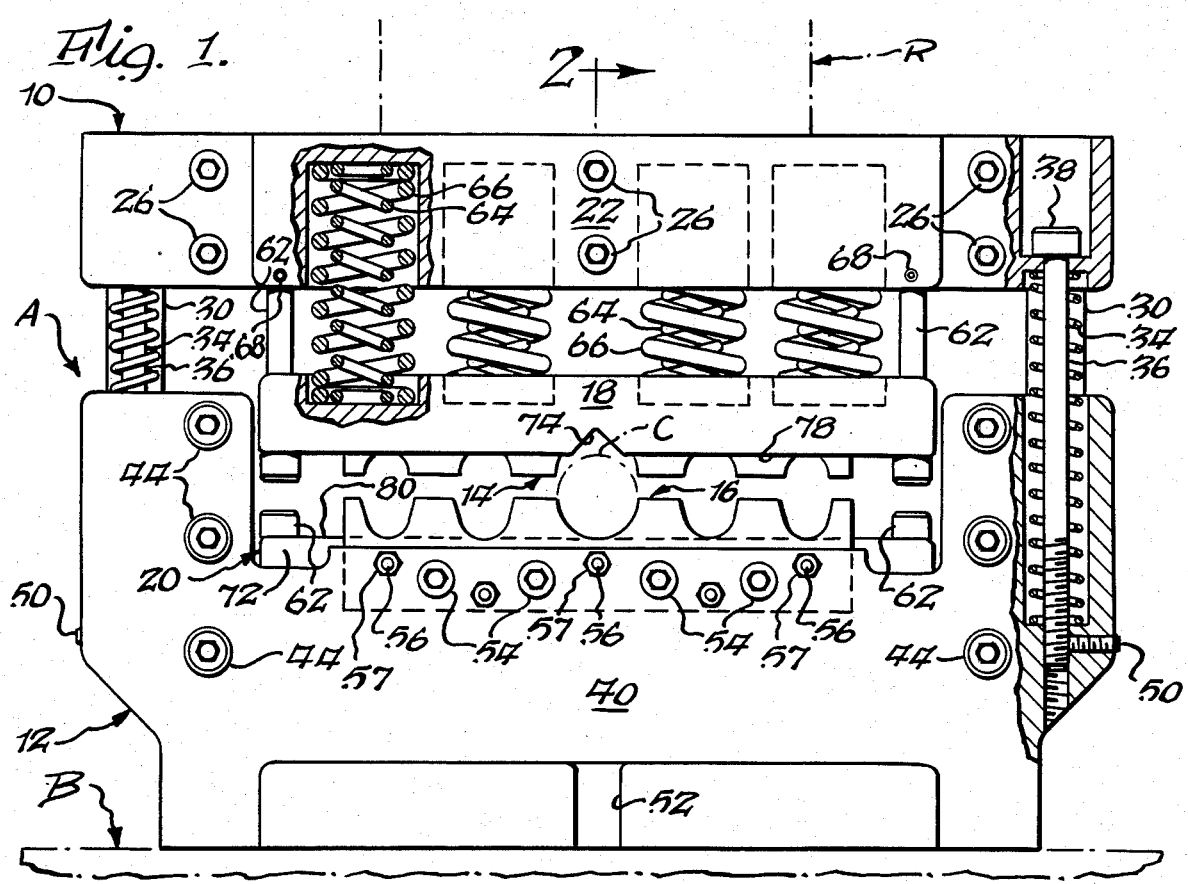
FIG. 1 is a front or entrance side elevational view taken on line 1—1 of FIG. 2 and illustrating a cutting tool insert assembly constituting a preferred embodiment of the invention, with portions being broken away in section, and with adjacent parts of a shear being shown in phantom.
Figure 2:
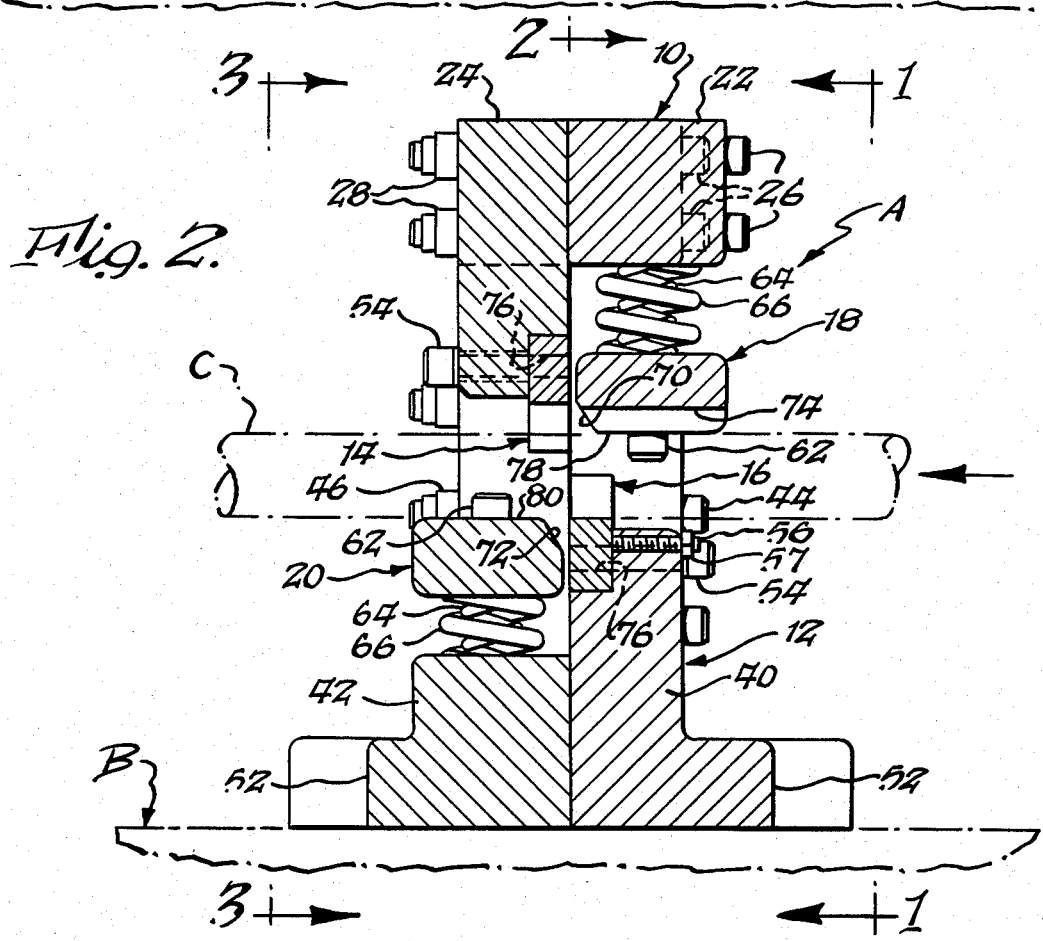
FIG. 2 is a section taken on line 2—2 of FIG. 1 and illustrating in phantom a round bar stock position prior to shearing.

Referring to the drawings, and particularly FIGS. 1-3, a preferred embodiment of the inventive cutting tool insert assembly is generally indicated at A on the stationary bolster plate B and beneath the vertically reciprocal ram B of a typical shear press, such as one operated by a hydraulic motor, not shown. The inventive assembly A generally includes an upper housing 10, a lower housing 12, an upper cutting tool 14, a lower cutting tool 16, a hold down 18, and a work support 20.

The upper housing 10 is composed of upstream and downstream blocks 22 and 24 respectively which are secured together by bolts or capscrews 26 and lock nuts 28, and are vertically movably mounted on lower housing 12 by guide rods or posts 30 secured in block 24 by set screws 32 (only one being shown), with such upper housing blocks being biased upwardly away from lower housing 12 by a pair of return springs 34 adjustable by studs or capscrews 36 having heads 38 operating in upstream block 22 (the details of only one being shown).

Likewise, lower housing 12 is composed of upstream block 40 and downstream block 42 which are secured together by bolts or capscrews 44 and lock nuts 46, with downstream block 42 being provided with bushings 48 (only one being shown) for slidably receiving the lower ends of guide posts 30. On the other hand, upstream block 40 receives the lower ends of each pair of return springs 34 and studs 36, and is provided with set screws 50 (only one being shown) for maintaining the selected height adjustment of upper housing 10 above lower housing 12.

As shown in FIG. 1, upper housing 10 is engageable by hydraulic ram R for downward closing movement toward lower housing 12, for shearing purposes, while springs 34 bias upper housing upwardly away from the lower housing to the open position illustrated. Although not shown, upper housing 10 may be provided with guide pins cooperable with the lower part of ram R for proper alinement, as well as eyebolts for the purpose of insertion, removal and replacement of assembly A. In addition, lower housing 12 preferably is provided with a slot 52 in each of blocks 40 and 42 to receive a T-bolt (not shown) for removably securing assembly A on bolster plate B.

Continuing with FIGS. 1–3, it is to be noted that each of upper and lower shear knife cutting tools 14 and 16 respectively are removably secured by studs or capscrews 54 on downstreams block 24 of upper housing 10 and upstream block 40 of lower housing 12 respectively, with lower knife 16 being offset upstream of upper knife 14 in the horizontal direction in which the stock is fed, a round or circular metal bar stock C being shown in phantom in FIGS. 1–3, and being fed in the direction of the arrow. In addition, lower knife 16 is movable laterally toward and away from upper knife 14 in such stock feed direction by means of set screws 56 and lock nuts 57 for adjusting the clearance between the knives. Upper knife 14 also is movable relative to lower knife 16, but longitudinally in block 24 in a horizontal direction transverse to both the horizontal stock feed direction and the vertical closing and opening movement direction by means of set screws 58 and lock nuts 60, as shown in FIG. 3 for the centering adjustment referred to in greater detail below.

As also seen in FIG. 2, an elongated hold down block 18 is mounted on upper block 22 adjacent upper knife 14 and opposite lower knife 16 for vertical movement toward and away from the lower knife by guide rods 62 in the form of capscrews passing through hold down 18 and threaded into block 22, with hold down 18 being biased downwardly to rest on the heads of guide rod capscrews 62 by four pairs of nested inner and outer springs 64, 66 respectively seated in block 22 and hold down 18 respectively. The vertical position of hold down 18 with respect to upper knife 14 is adjustable by means of set screws 68 engaging capscrews 62 in block 22, for a purpose to be considered in further detail below. Likewise, an enlongated work support block 20 is mounted on lower housing block 42 adjacent lower knife 16 and opposite upper knife 14 for vertical movement toward and away from the upper knife by the aforesaid capscrew guide rods 62 passing through work support 20 and threaded into lower housing block 42, with work support 20 being biased upwardly against the heads of capscrews 62 by four additional pairs of the aforesaid nested inner and outer springs 64, 66 respectively seated in block 42 and work support 20 respectively. The vertical position of work support 20 with respect to lower knife 16 is adjustable by means of set screws 68 engaging capscrews 62 in block 42, also for a purpose to be discussed further below. As best seen in FIG. 2, the sides of hold down 18 and work support 20 facing upper and lower knives 14 and 16 respectively are slightly spaced from the knives and are tapered away therefrom at 70 and 72 respectively for clearance purposes. Also, as shown in FIGS. 1 and 3, hold down 18 is relieved to form a V-groove or recess at 74 for clearing and clamping the bar stock of largest cross-section, such as C.

As also illustrated in FIGS. 4 and 5, upper and lower knives 14 and 16 respectively are preferred embodiments of the type of knives used for shearing round or circular bar stock C with each being provided with internally threaded openings 76 for engagement with capscrews 54 passing through block 24 (FIG. 2) with sufficient clearance to allow for the desired centering adjustment. However, the same pair of knives can be used for shearing stock of varying diameters by providing each with recessed cutting edges of varying width and depth formed by so cutting away the opposing and proximately spaced edge surfaces, thereof. Thus for shearing the bar C shown in FIGS. 1–3, the center cutting edge surfaces 14a, 16a would be used; for simultaneously shearing two smaller diameter bars (not shown), surfaces 14b, 16b would be used, and for simultaneously shearing two smallest diameter bars (not shown) surfaces 14c, 16c would be employed, it being noted that each of lower cutting edge surfaces 14a, b and c are semicircular in shape, while only upper cutting edge surface 16a is so shaped, with surfaces 16b and c being deepened to the same depth as surface 16a for cooperation with work support 20, as detailed below. It will be appreciated that the actual cutting edges are formed by the junctures of surfaces 14a etc., 16a etc. and the respective longitudinal side walls of the respective knives or blades 14, 16, so that each knife has two sets of cutting edges, and can be reversed to present a fresh set when the first used set dulls.

Returning to FIGS. 1–3, prior to operation, the clearance between knives and centering on the workstock respectively are adjusted as follows. For clearance adjustment, depending upon factors such stock size, shape, material, and strength, as well as desired quality of cut, while lower knife 16 is laterally loose in housing block 40 (capscrews 54 hand tight), set screws 56 are adjusted to the desired clearance, whereupon nuts 57 and capscrews 54 are locked tight. For stock centering adjustment, such as bar C, with top knife 14 longitudinally loose in housing block 24 (capscrews 54 hand tight), the top knife first is jogged down onto the barstock, such as C, positioned in lower knife 16, and then centered on the bar by means of set screws 58 and lock nuts 60, followed by locking capscrews 54.

During operation, not only the relationship between the lower clamping surface 78 of hold down 18 and cutting edge surfaces 14a, b and c of upper knife 14, but also the relationship between the upper clamping surface 80 of work support 20 and cutting edge surfaces 16a, b and c are important for proper shearing. Thus, such lower surface 78 (including V-shaped recess 74 therein) is located, as measured in a vertical direction, closer to the alined bottoms of upper cutting edge surfaces 16a, b and c respectively, which bottoms are the upper cutting edge surface portions initially supportively engaging the round bar stock of the appropriate size and shape (only bar C resting on the bottom of edge surface 16a being shown), than are the unalined tops of lower cutting edge surfaces 14a, b and c respectively, which tops are the lower cutting edge surface portions initially shearingly engaging the round bar stock of the appropriate size and shape, such as C, and which tops are remotely spaced apart from the bottoms of the aforesaid upper cutting edge surfaces. At the same time, as best seen in FIGS. 1 and 2, surface 78 (including notch 74) is located above the lower edge surface of upper knife 14, and hence not as close to the bottoms of recessed upper cutting edge surfaces 16a, b and c as is such lower edge surface of the upper knife. Accordingly, during closing movement of upper housing 10 downwardly toward lower housing 12, by action of ram R, lower hold down surface 78, such as recessed portion 74, resiliently clamps the upstream portion of the stock, such as C, against the appropriate upper cutting edge surface, such as 16a, prior to and during shearing engagement with the downstream portion or blank of the stock, such as C, by the appropriate lower cutting edge surface, such as 14a, in order to prevent the upstream stock portion from moving upwardly, i.e. kicking, during shearing.

Moreover, the upper surface 80 of work support 20 is located, as measured vertically, no further from the initial stock engaging top portion of the appropriate lower cutting edge surface, such as 14a (although it could be anyone of 14a; b and c), than is the initial stock engaging bottom portion of the appropriate upper cutting edge surface, such as 16a (or 16b or 16c). At the same time, as best seen in FIGS. 2 and 3, surface 80 is located below the upper edge surface of lower knife 16, and hence not as close to the tops of recessed lower edges 14a, b and c as is such upper edge surface of the lower knife. Preferably, such upper work support surface 80 is substantially flush with such alined bottom cutting edge surface portions 16a, b and c to facilitate stock feed. As a result, during the aforesaid closing movement, work support 20 resilient clamps the downstream portion of the stock, such as C, upwardly against upper shear knife 14 during shearing, in order to prevent such downstream stock portion from moving downwardly, i.e. bending during shearing. Therefore, the cut produced is precise, sharp, square and to the proper length without distortion or burred edges.

Continuing with FIGS. 6 and 7, the upper and lower knives 140 and 160 respectively shown therein are preferred embodiments of the type employed for shearing metal bar stock of square cross-section, (not shown), and are provided respectively not only with the appropriate threaded holes 76, but also with the appropriate V-shaped cutting edge surfaces ranging from the largest size 140a, 160a to the intermediate size 140b, 160b and the smallest size 140c, 160c. For comparison purposes, the locations of the lower hold down surface 78 (including recess 74 for clearing and clamping the square bar of largest cross-section, not shown) and upper work support surface 80 are shown in phantom, as in the same relative vertical positions with respect to the upper and lower cutting edge surfaces respectively as for the round bar stock of FIGS. 1–3, and therefore produce the same beneficial results, with the clearance and centering adjustments being carried out in the same manner. Of course, the actual cutting edges are formed by the junctures of the respective cutting edge surfaces 140a etc., 160a, etc. and the longitudinal sides of the respective knives or blades to provide each with two sets of cutting edges.

Further, although FIGS. 4 and 5 show cutting edge surfaces for shearing round bar stock, other arcuate cross-sectional shapes could be accommodated by appropriate modification of the arcurate shape of such cutting edge surfaces. Correspondingly, the V-shaped cutting edges of FIGS. 6 and 7 could be used and/or modified in shape to cut various polygonal cross-sections.

Referring now to FIGS. 8 and 9, upper and lower knives 142 and 162 respectively are shown as preferred embodiments for cutting flat or sheet metal stock, with the upper knife 142 being provided with threaded holes 76 and a single longitudinally raked lower cutting edge surface 142a providing an alternately usable pair of cutting edges. The lower knife 162 is provided with threaded 76 and an upper cutting edge surface 162a also providing an alternately usable pair of cutting edges. Once again, the relative vertical positions of lower hold down surface 78 (including recess 74) and upper work support surface 80 are shown in phantom, in order to produce the same beneficial results upon closing movement, as the previously described knife or blade pairs. It, of course, is evident that the lower end portion of the raked lower cutting edge surface 142a would initially engage the stock, and hence the horizontal lower hold down surface 78 would be located below this end portion, in order to be closer to the horizontal upper cutting edge surface 162a, the entire portion of which initially supportively engages the stock, than is such lower end portion of surface 142a. Furthermore, upper work support surface 80 is no further from much lower end portion of cutting edge surface 142a than is cutting edge surface 162a, and preferably is substantially flush with such surface 162a. As for clearance adjustment this could be accomplished as before, with little or no need for centering adjustment of upper knife 142, except possibly with respect to lower knife 162.

It will now be seen how the invention accomplishes its various objectives, and numerours advantages of the invention also apparent. While the invention has been described and shown herein by reference to preferred embodiments, it is to be understood that various changes and modifications may be made in the invention by one skilled in the art without departing from the invention, the scope of which is to be determined by the appended claims.

What is claimed is:

1. A removable cutting tool insert assembly for shears fed with stock, such as bar stock; said assembly including upper and lower housings; and means mounting said housings on each other for relative closing movement toward and opening movement away from each other in one direction transverse to the stock feed direction; said mounting means including resilient means normally biasing said housings into spaced apart relationship; wherein the improvement comprises: upper and lower knives on said upper and lower housings respectively, with one of said knives being offset downstream from the other of said knives in the stock feed direction and with both of said knives being elongated in another direction transverse to both said one direction and the stock feed direction; said means mounting said knives including adjustable means providing for relative movement of said knives not only toward and away from each other in the stock feed direction for adjusting the clearance between said knives, but also along each other in said other direction, for centering said knives; said upper and lower knives having lower and upper edge surfaces respectively opposing and proximately spaced from each other in said one direction, with said lower and upper edge surfaces being cut away to provide recessed cutting edge surfaces forming respectively top and bottom initial stock engaging portions opposing and remotely spaced from each other in said one direction;

a hold down and a work support elongated in said other direction and having lower and upper clamping surfaces respectively; and means movably mounting said hold down and work support on said upper and lower housings respectively adjacent said upper and lower knives respectively, with said lower and upper clamping surfaces facing said bottom and top initial stock engaging portions respectively; said hold down and work support mounting means including resilient means normally biasing said hold down and work support toward said lower and upper knives respectively, one positioning means locating one of said clamping surfaces closer to the opposite one of said initial stock engaging portions than is the other of said initial stock engaging portions, but not as close to said one intial stock engaging portion as is said edge surface of said knife adjacent said one clamping surface, and another positioning means locating the other of said clamping surfaces no further from said other initial stock engaging portion than is said one initial stock engaging portion, but not as close to said other initial stock engaging portion as is said edge surface of said knife adjacent said other clamping surface; whereby upon said closing movement, said one clamping surface resiliently clamps one of the upstream and downstream stock portions against the opposite one of said knives both prior to and during shearing, in order to prevent the one stock portion from kicking, while said other clamping surface resiliently clamps the other of the upstream and downstream stock portions against the opposite other of said knives during shearing, in order to prevent the other stock portion from bending.

2. The cutting tool insert assembly of claim 1, wherein said upper knife is offset downstream from said lower knife; said means mounting said knives include adjustable means engageable with one of said knives for moving the same toward and away from the other of said knives in the stock feed direction, for adjustig the clearance between said knives, and adjustable means engageable with said other knife for moving the same along said one knife in said other direction, for centering said knives; said one positioning means locating said lower claming surface closer to said bottom initial stock engaging portion than is said top initial stock engaging portion, but not as close to said bottom initial stock engaging portion as is said lower edge surface of said upper knife; and said other positioning means locates said upper clamping surface substantially flush with said bottom initial stock engaging portion, to facilitate stock feed; whereby upon said closing movement, said lower clamping surface resiliently clamps the upstream stock portion against said lower knife prior to and during shearing, in order to prevent the upstream stock portion from kicking, while said upper clamping surface resiliently clamps the downstream stock portion against said upper knife during shearing, in order to prevent the downstream stock portion from bending.

* * * * *